IMAGE INTENSIFYING X-RADIATION INSPECTION SYSTEM WITH PERIODIC BEAM SCANNING
Filed Aug. 8, 1962
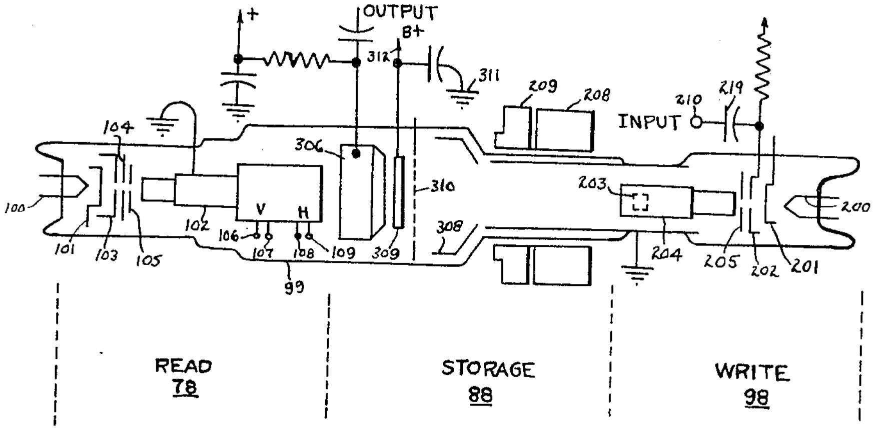
Fig. 1
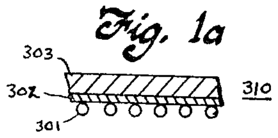
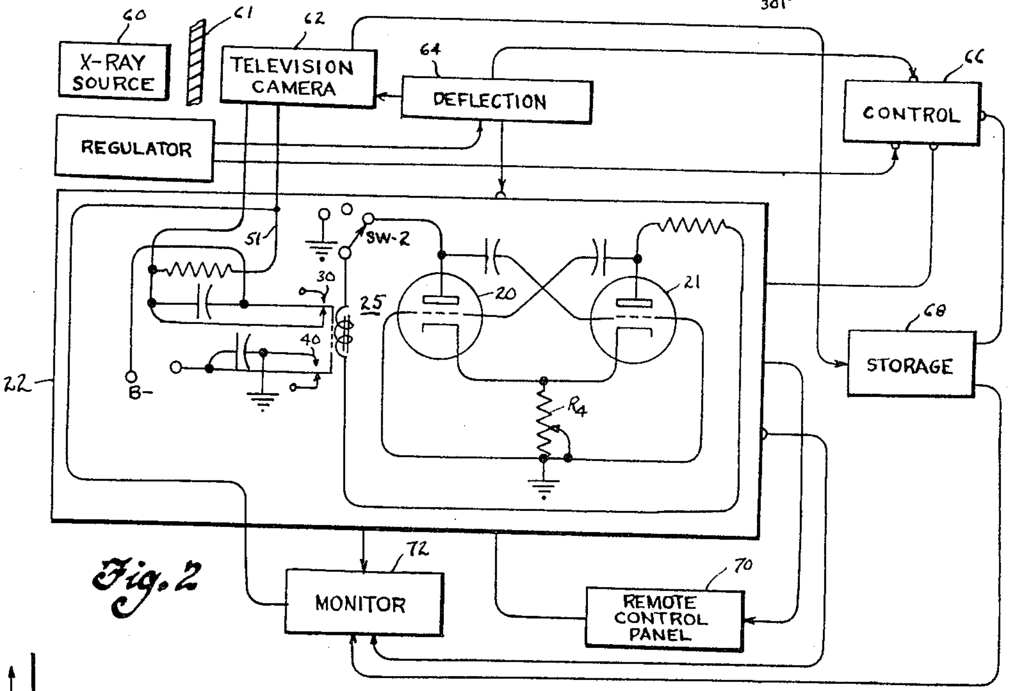
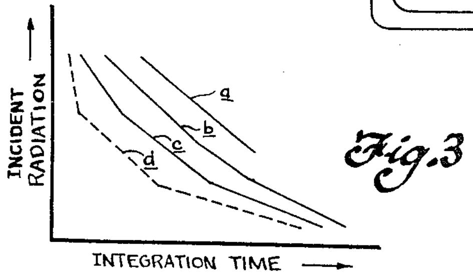
INVENTORS
Robert C. McMaster
Jay Q. Mitchell
Merle L. Rhoten
By Anthony D. Cennamo
ATTORNEY United States Patent Office 3,280,253
Patented Oct. 18, 1966

3,280,253

IMAGE INTENSIFYING X-RADIATION INSPECTION SYSTEM WITH PERIODIC BEAM SCANNING

Robert C. McMaster, Jay P. Mitchell, and Merle L. Rhoten, Columbus, Ohio, assignors to The Ohio State University Research Foundation, a corporation of Ohio Filed Aug. 8, 1962, Ser. No. 215,643
5 Claims. (Cl. 178—6.8)

This invention relates generally to a television X-ray image enlargement system and particularly to a method and means of improving the video signal levels in such a system.

The present invention is an improvement on and relates to the television X-ray image system disclosed in our copending application, S. N. 162,500, filed December 27, 1961. The system therein permits instantaneous inspection of test objects with many times image enlargement. Performance has been achieved through the utilization of photoconductive types of television camera tubes of small diameter operative to convert X-ray images directly into video signals.

Although the system is capable of revealing X-ray images of extremely fine sensitivity and detail resolution, limitations arise in consequence of the relatively low video output signals obtainable from presently available X-ray-sensing camera tubes. This limitation becomes severe with dense or thick test materials that attenuate the incident X-ray beam. In a typical instance, 20 to 200 roentgens per minute (r./min.) must be transmitted to the input tube target to obtain adequate video signal levels. This performance limitation is a direct consequence of the 30-frame per second, interlaced scanning rate of the input image by the scanning electron beam. In operation of the conventional camera tube, X-radiation images are integrated on the target of the camera tube for only 1/30 second, or 1/1800 minute, between scans. The exposure of the target is thus only of the order of 0.1 roentgen (r.) with incident radiation intensities of the order of 180 r./min. or 0.01 r. with 18 r./min. For comparison, these exposure levels are notably lower than those required to attain adequate images on X-ray film. For example, fine-grain Class I X-ray films require in the order of two roentgens, and Class II films about 0.5 roentgens, for optimum exposures in the absence of intensifying screens. The selenium-target X-ray-sensing camera tubes (such as that utilized in the copending application) thus have an exposure speed higher than that of photographic X-ray films, varying from perhaps 5:1 up to 200:1, depending upon the output signal level from the input tube. In film radiography, this relatively slow exposure speed is compensated for by an increase in exposure time (by the reciprocity law, low rates of exposure are corrected by long exposure times). The full capabilities of the television X-ray image enlargement system can be attained by providing similar means for utilizing longer exposures when necessary to compensate for the attenuation of the X-ray beam in dense or thick test objects.

Increased signal output can be obtained from the X-ray-sensitive vidicon camera tube by periodically turning on its electron scanning beam rather than having it on constantly. It has been found that the electrical charge on the target of the vidicon tube builds up to a greater amplitude when it is not scanned by an electron beam as often as 1/30-second. Hence, when the scanning electron beam is switched on for a very short time after the tube has been exposed to X-radiation for a comparatively long time, a television X-ray image with an improved contrast range can be observed.

In accordance with the present invention, the radiation sensitive target materials of the television camera tubes integrate the X-ray exposure during the period between successive scans of the electron beam. By periodic scanning interruption, weak X-ray beams (attenuated by the test material) build up adequate signal levels to provide high contrast and good signal-to-noise ratios in the output images. The effectiveness of the improvement to the system has been demonstrated particularly when faint X-ray images are examined for low-contrast discontinuities. However, the enhanced image resulting from interruption of scanning appears only as a transient (one or a few 1/30 second frames) when scanning is resumed. The image then fades back to the low contrast, "noisy" signal characteristic of continuous scanning.

In order to utilize the improvements resulting from longer exposure periods prior to scanning and readout of X-ray-sensing television camera tube targets, there is further provided in the present invention an effective means of recording and continuously thereafter reproducing the fugitive, high-contrast, transient image. This function is performed in the present invention by an intermediate, single-frame video memory element. Specifically, a modified scan-conversion system is incorporated into the television chain system to record single-frame television images, and to provide a continuous sequence of output video signals. From these output video signals the original image can be reproduced continuously with an output monitor's picture tube. Reading with conventional television raster scanning, a typical scan-conversion tube can retain information from between 100 and 5000 scans. Typical storage characteristic curves indicate that output signal amplitudes may decrease to half of their initial values after some 4 to 20 seconds. During these decay periods, the X-ray exposure is continued to again recharge the target of the X-ray-sensing camera tube. The resultant signal is again read-out into the storage system's scan conversion tube to renew the output image strength. Thus, it would be possible to preserve a specific X-ray image for a period as long as needed for complete inspection of the test object and evaluation of its discontinuities. Optimum intervals between exposures and recharging operations have been found to be a function of the various types of X-ray source, test object materials and thicknesses, and image requirements.

The over-all system of the present invention provides optimum image contrast, definition, penetrameter sensitivity, material thickness limits, and performance as an inspection system. Most significantly, however, the system provides up to 10,000 times gain in signal level—without an increase in noise. Further, by integrating over long periods of time, the noise signals are averaged out including the quantum noise in weak X-ray beams and other noises, such as photon noises are abolished.

The system of the present invention finds special utility in those fields of interest where it is possible to radiate the object for only a short period of time. This immediately suggests flash radiography system, such as for viewing bullets in flight or explosions. The other primary field of interest is where it is desired that the object be radiated only for short periods of time, i.e., medical uses. It has been found that the system of the present invention is one to two orders of magnitude faster than conventional radiography and the radiation is reduced to 1/10 of that normally used in medical radiography. Of equal significance is that the X-ray "picture" is instantaneous—the 15 to 20 minute development delay is eliminated. Although the exposure time has been reduced fantastically, the picture can be viewed for up to 15 minutes. The absolute necessity of X-ray to medical uses has continuously been in conflict with over-exposure of the patient to harmful radiation. It is apparent, therefore, that this system materially increases the use of X-ray to medical uses, but yet reduces the radiation exposure rate to the patient to a non-objectionable, negligible amount.

It is accordingly a principal object of the present invention to provide a new and improved exposure-integration system for incorporation into an X-ray image television monitoring enlargement system.

It is a further object of the present invention to provide an X-ray image television monitoring enlargement system having an improved contrast, definition, and signal-to-noise ratio.

Another object of the present invention is to provide a television X-ray image system wherein the k.v.a. demand and loading of the X-ray sources is considerably reduced.

Another object of the present invention is to provide an improved X-ray image system having an increased source—object distance and hence an improvement in the geometric unsharpness of the X-ray images.

Another object of the present invention is to provide an improved X-ray image system with an increased range of the inspection system with increased capacity to penetrate thick or heavily-absorbing test objects.

Still another object of this invention is to provide for the elimination of image blurring resulting from photoconductive lag in target materials used in X-ray-sensing camera tubes and from object motion during the 1/30-second frame periods.

Other objects and features of the present invention will become apparent from the following detailed description when taken in conjunction with the drawings in which, FIG. 1 is a schematic circuit diagram of a storage tube utilized in the present invention;

FIG. 1*a* is a cross-sectional view of the storage target of the storage tube of FIG. 1; and, FIG. 2 is a block schematic of a preferred embodiment of the invention further showing the pulse interruption circuit in schematic;

FIG. 3 is a graph showing the relationship of integration time to radiation level.

Although the scan conversion tube, per se, does not form a part of the present invention, a brief explanation thereof will assist in understanding the combination system of the present invention. The scan conversion storage tube is a dual-gun electrical-signal storage tube with a semiconductive storage medium. This tube is capable of receiving an electrical input of one scanning mode, holding or storing this information for an interval of time, and then reading out an electrical signal to an output using the same or any other desired scanning mode.

Referring now to FIG. 1, there is shown a schematic diagram of the storage tube structure as utilized in the present invention. Basically, the storage tube consists of three sections: the reading section, the writing section, and the storage assembly section. All three sections are enclosed within the envelope 99. The reading section 78 comprises principally a reading gun of the tetrode type. The primary function of this section is to produce a medium velocity electron beam that is electrostatically focused and deflected by vertical deflection plates 106 and 107 and horizontal deflection plates 108 and 109. A cathode 101 indirectly heated by heaters 100, a control grid 103, a screen grid 104, focusing anode 105, and an accelerating anode 102 complete this section.

The writing section 98 comprises principally a writing gun of the triode type. The primary function of this section is to produce a high velocity electron beam. This beam is electromagnetically deflected by deflection coil 208 centered by centering coil 209 and focused by focusing anode 203. A cathode 201 indirectly heated by heaters 200, a control grid 202, and an accelerating anode 205 complete this section.

The storage section 88 comprises basically a storage target positioned between the reading section and the writing section. Referring now also to FIG. 1*a*, the target per se consists of a high transmission mesh 301, which together with a thin metal foil 302, forms the backing electrode 310. Deposited on this backing electrode is a semiconductive material 303 that completes the storage target. An accelerating anode 308, a corrector ring 309, and a collector electrode 306 complete the storage section.

The basic operation of the scan conversion tube can be understood by visualizing the target as a group of miniature elemental capacitors which are capable of storing information in the form of electrical potentials. The resolution capability is not limited by the size of the supporting mesh aperture. More than one picture element can be stored within a mesh enclosure.

While the backing electrode 310 is held at ground or zero potential by grounding at 311, the scanning action of the reading gun electron beam charges the storage surface which faces the read gun in a positive direction. This charge approximates the collector 306 potential derived from B-plus source 312. At this charge level there is an equilibrium background level when the write gun is not operating. For example, if the collector 306 is at 20 volts, the complete storage surface of the storage material 303 is charged to within a few volts of this value, maintaining a secondary emission collection ratio of unity, that is, the number of electrons transferred to the collector 306 is equal to the number of electrons hitting the target 303.

The electrical input signal is applied to the cathode 201 or grid 202 of the write gun at input 210 through isolation capacitor 219. In a known manner the input signal modulates the beam current. The high velocity electrons penetrate the thin metal foil 302 of the backing electrode 310 and continue into semiconductive storage material 303. These electrons produce bombardment-induced conductivity by increasing the mobility of charge carriers within the material 303. In turn, these charge carriers decrease the potential of that particular storage element. For example, if the storage element is at about 20 volts equilibrium potential, this potential is reduced to somewhat below 20 volts, depending upon the beam current. Thus, the input information of the complete scan is stored in the form of electrical potentials in fixed positions over the storage surface. Although the writing current is the main factor establishing the amplitude of the stored signal, other factors such as pulse repetition rate, scanning speed, electron beam energy, and pulse duty cycle, have definite effects.

As the read gun returns the storage surface to its equilibrium state, the effect of secondary emission ratios of the written areas varies in proportion to the differences in potential; i.e., the greater the induced conductivity or depressed potential of the particular area, the more secondary electrons will be emitted and collected at the collector electrode 306. This action of the read gun is known as capacity charge reading. The longer it takes to recharge a certain area, the longer the storage. Therefore, the collector time varies inversely with the read-beam current and directly with the collector potential which establishes the equilibrium charge on the target.

Reading with conventional television raster scanning, the target can retain information from between 100 to 5000 scans. Other storage targets can be fabricated to operate outside these limits permitting a wide family of storage characteristics. Erasure is accomplished by normal operating action of the read gun. Erase time can be shortened by momentarily increasing the reading beam current.

With a basic review of the scan conversion tube, an understanding may now be had how this element comprises an essential feature of the system of the present invention. Referring now specifically to the circuit enclosed in block 22 of FIG. 2, there is a showing of the system component arrangement for intermittent scan operation of the X-ray-sensing television camera tube 62 by an X-ray source 60 of a workpiece 61 to produce a workpiece image on the television camera tube 62. The circuit comprising vacuum tubes 20 and 21 through the interconnection of the grid-to-plate and common cathode connection is a conventional multivibrator circuit. Essentially, this circuit is simply an on-off operation and any other known circuit may be substituted therefor. The function of the on-off circuit is to operate the relay 25. The function of relay 25 is to change the voltage level on the normally biased-off grid circuit and thereby permitting the radiation sensitive target to be periodically scanned. More specifically, a bias voltage is applied via lead 51 to the grid circuit of the television camera of a sufficient level to prevent the target from being scanned. This level of voltage is maintained by the first state of the multivibrator circuit. That is, the contacts 30 and 40 of switch 25 are maintained in an "open" position. In the second state of the multivibrator circuit, the relay 25 is actuated thereby shunting the grid circuit bias voltage with another voltage of a fixed level. The resulting voltage that is in this condition applied to the grid circuit of the television camera is not of sufficient level to prevent scanning under the influence of deflection means 64 as controlled by a regulator as shown in FIG. 2. In this way, the scanning beam is permitted to pass the control grid and consequently the target is scanned. Between scanning periods, the radiation sensitive target materials integrate the radiation exposure thereby permitting weak X-ray signals to build up adequate signal levels. In actual operation, the scanning electron beam is switched on for a very short time, i.e., in the order of three frames, each of $\frac{1}{30}$-second duration after the tube has been exposed to X-radiation for a comparatively long time.

In the conventional closed circuit television system, the enhanced image resulting from interruption of scanning appears only as a transient when scanning is resumed. The image will fade back to the low contrast signal characteristic of continuous scanning. In order to utilize the improvements resulting from the longer exposure periods prior to scanning and read-out of X-ray-sensing television camera tube targets, an effective means is provided for recording and thereafter continuously reproducing the fugitive, high-contrast, transient image. This function is performed by feeding the detected signal to a scan-conversion storage tube 68 similar to that described above and shown in FIG. 1. In the system of the present invention, the storage system records single-frame television images and provides to the monitor 72 a continuous sequence of output video signals. From these stored video signals the original image is reproduced continuously. The pulse generator frequency repetition rate is varied by the setting of potentiometer R4 shown in the circuit of FIG. 2.

The selector switch, SW2, is set at repetitive operation mode when the pulse generator is used at a pulse repetition rate within its operating range. When longer integration time intervals are required, the system is operated by setting the selector switch SW2 in the manual position at the beginning of the time interval and turning it to normal position at the end of the time interval. Also, with SW2 in the normal position, the television control 66 can be set for steady-state scan operation. When changing from steady-state scan operation to intermittent scan operation, the camera beam and monitor brightness controls may require a slight readjustment as may be introduced by readjustment at the remote control panel 70 in a manner similar to control 66. At the monitor, the auxiliary brightness control is set at a preselected point such that the picture tube raster just becomes invisible when SW2 is in the manual position.

In order to determine the possible capabilities of the intermittent scan technique, tests were carried out at various X-radiation levels at a constant kilovoltage, to determine the integration time required to produce a television image with acceptable contrast. A commercially available rate-meter probe was mounted adjacent to and in the same plane as the television camera tube face-plate. The radiation levels at the camera tube were reduced to values less than 0.01 r./min. by using long source-detector distances (30 to 50 inches) and by placing a 0.125-inch thick steel plate in the X-ray beam. The 150 kv. X-ray source was operated at a constant 60 kvcp. during the test. A 60 mesh ASA screen, taped to the vidicon camera tube window, could be visualized with fair contrast on the monitor screen when sufficient integration time had elapsed for a given radiation level. FIG. 3 is a graph showing the relationship of integration time to radiation level. From these family of curves, the X-radiation levels required for various integration time intervals and various image conditions are shown. By acceptable standards, the curve *a* is considered to correspond to a very good image; curve *b* a good image; curve *c* a fair image; and curve *d* an invisible image. It is apparent that even though the X-ray television image is visible for only a fraction of a second, the input image may be integrated for up to 13 minutes with acceptable contrast for observation and analysis.

The system disclosed herein provides an intermediate memory system for single-frame X-ray images integrated into an X-ray image enlargement equipment developed in accordance with the aforementioned co-pending application. The present system will permit integration of exposures for desired intervals, and continuous read-out of images on output monitor picture tubes that otherwise would not be available for viewing. The exposure intervals are timed as desired and repeated automatically to provide continuous output images, with intermittent exposures and scanning of the input camera tube targets. The over-all system of the present invention provides optimum image contrast, definition, penetrameter sensitivity, material thickness limits, and performance as an inspection system with up to 10,000× gain in signal level, and improved signal-to-noise ratios.

Although we have shown certain and specific embodiments, it is to be understood that modifications may be had without departing from the spirit and scope of the invention.

What is claimed is:

1. A closed circuit television system including a source of X-radiation for projection onto a workpiece and produce a workpiece image, an X-radiation sensitive camera tube for converting detected radiation into electrical signals representative of the workpiece image, said tube including a target layer sensitive to X-radiation and adapted to be exposed to X-radiation representative of the workpiece image, said layer operative to integrate the exposure of the workpiece image, means for scanning said layer with an electron beam at a given frame rate, means for selectively biasing said tube at a level of bias to restrain said electron beam from scanning said target layer; an on-off generator operative to periodically vary the level of said bias on said tube to periodically permit said electron beam to scan said layer to produce an intermittent image, and thereby permit said layer to build up its electrical charge, storage means connected from said camera to record single frame television images for storing said images and to provide an output of a continuous sequence of output video signals, read-out means, and means for connecting the output of said storage means to said read-out means for continuously indicating one of the intermittent images of said workpiece image, said storage means being a scan-conversion tube having read, storage, and write sections, said read-out means being a television monitor.

2. A closed circuit television system as set forth in claim 1 wherein said on-off generator is a pulse generator and further includes a relay mechanism having at least a pair of contacts, one of said contacts operative to alter the level of said bias on said tube.

3. A closed circuit television system as set forth in claim 1 wherein said on-off generator is a pulse generator and further includes a two-state device, one of said states operative to alter the level of said bias on said tube.

4. A closed circuit television system as set forth in claim 1 wherein said layer of semiconductive material is a selenium target layer.

5. A closed circuit television system as set forth in claim 1 wherein said scanning period is in the order of three frames and said period between scans is in the order of one to fifteen seconds.

References Cited by the Examiner

UNITED STATES PATENTS

| | | | |
|---|---|---|---|
| 2,550,316 | 4/1951 | Wilder | 178—6 X |
| 2,699,512 | 1/1955 | Sheldon | 313—65 |
| 2,747,131 | 5/1956 | Sheldon | 178—6 X |
| 2,922,842 | 1/1960 | Hergenrother | 178—6 |
| 2,973,445 | 2/1961 | Rogers | 178—6.8 |
| 3,076,054 | 1/1963 | Simon | 178—6.5 |
| 3,090,829 | 5/1963 | Lee et al. | 178—6.8 |

OTHER REFERENCES

"A Large Screen X-Ray Image Amplifier," Electronic Engineering, June 1959, pp. 352–353, TK 6630.A2T2.

DAVID G. REDINBAUGH, *Primary Examiner*

R. M. HESSIN, B. V. SAFOUREK, *Assistant Examiners.*